(12) United States Patent
Pai-Paranjape et al.

(10) Patent No.: US 7,250,612 B2
(45) Date of Patent: Jul. 31, 2007

(54) DEVICES AND METHODS CAPABLE OF AUTHENTICATING BATTERIES

(75) Inventors: Vandita Pai-Paranjape, Evansville, IN (US); Philippe Schottland, West Chester, OH (US); Micah S. Sze, Albany, NY (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 11/238,029

(22) Filed: Sep. 28, 2005

(65) Prior Publication Data

US 2007/0069153 A1 Mar. 29, 2007

(51) Int. Cl.
*G01N 21/64* (2006.01)

(52) U.S. Cl. .............................. 250/461.1; 250/456.1; 250/459.1; 320/106

(58) Field of Classification Search ............... 320/106; 250/461.1, 459.1, 458.1
See application file for complete search history.

(56) References Cited

U.S. PATENT DOCUMENTS

| | | | |
|---|---|---|---|
| 3,803,085 A | 4/1974 | Takehoshi et al. |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,905,942 A | 9/1975 | Takekoshi et al. |
| 3,957,526 A | 5/1976 | Hodgkin et al. |
| 3,961,975 A | 6/1976 | Zannucci et al. |
| 3,971,755 A | 7/1976 | Zannucci et al. |
| 3,972,902 A | 8/1976 | Heath et al. |
| 3,983,093 A | 9/1976 | Williams, III et al. |
| 4,238,524 A | 12/1980 | LaLiberte et al. |
| 4,287,228 A | 9/1981 | Schlesinger |
| 4,357,170 A | 11/1982 | Brand |
| 4,388,425 A | 6/1983 | Strehler et al. |
| 4,443,591 A | 4/1984 | Schmidt et al. |
| 4,455,410 A | 6/1984 | Giles, Jr. |
| 4,564,858 A | 1/1986 | Resch |
| 5,005,873 A | 4/1991 | West |
| 5,229,482 A | 7/1993 | Brunelle |
| 5,256,728 A | 10/1993 | Dardaris et al. |
| 5,314,072 A | 5/1994 | Frankel et al. |

(Continued)

FOREIGN PATENT DOCUMENTS

EP 0 526 161 A1 2/1993

(Continued)

OTHER PUBLICATIONS

WO9418100. Publication Date Aug. 18, 1994. "System For Identifying, Searching For And Locating Objects" (Abstract Only).

(Continued)

*Primary Examiner*—Constantine Hannaher (57) ABSTRACT

Battery-powered devices which are capable of authenticating batteries. In one embodiment, a device comprises: a battery, an excitation source, a photodetector, and an operating system. The device is capable of at least partially being powered by the battery. The excitation source is capable of producing radiation and disposed so that the radiation can contact a surface of the battery. The photodetector is capable of detecting radiation from the battery. The operating system is capable of determining whether or not the battery is an authentic battery for that device.

23 Claims, 3 Drawing Sheets

U.S. PATENT DOCUMENTS

| | | | |
|---|---|---|---|
| 5,329,127 A | 7/1994 | Becker et al. | |
| 5,373,306 A | 12/1994 | Amore et al. | |
| 5,452,379 A | 9/1995 | Poor | |
| 5,461,136 A | 10/1995 | Krutak et al. | |
| 5,510,619 A | 4/1996 | Zachmann et al. | |
| 5,534,602 A | 7/1996 | Lupinski et al. | |
| 5,553,714 A | 9/1996 | Cushman et al. | |
| 5,573,909 A | 11/1996 | Singer et al. | |
| 5,703,229 A | 12/1997 | Krutak et al. | |
| 5,830,974 A | 11/1998 | Schmidhauser et al. | |
| 5,881,196 A | 3/1999 | Phillips | |
| 5,986,550 A | 11/1999 | Rapaport et al. | |
| 6,017,993 A | 1/2000 | Maeda et al. | |
| 6,099,930 A | 8/2000 | Cyr et al. | |
| 6,132,897 A | 10/2000 | Chen | |
| 6,133,360 A | 10/2000 | Barren et al. | |
| 6,200,628 B1 | 3/2001 | Rozumek et al. | |
| 6,236,186 B1 | 5/2001 | Helton et al. | |
| 6,297,508 B1 | 10/2001 | Barmore et al. | |
| 6,317,947 B1 | 11/2001 | Ruschmann | |
| 6,410,614 B1 | 6/2002 | Jones et al. | |
| 6,500,526 B1 | 12/2002 | Hannington | |
| 6,514,617 B1 | 2/2003 | Hubbard et al. | |
| 6,559,270 B1 | 5/2003 | Siclovan et al. | |
| 6,583,256 B2 | 6/2003 | Vollenberg et al. | |
| 6,607,794 B1 | 8/2003 | Wilson et al. | |
| 6,849,706 B1 | 2/2005 | Brunelle et al. | |
| 6,916,548 B2 | 7/2005 | Murschall et al. | |
| 6,930,866 B2 | 8/2005 | Jayasekara | |
| 7,079,230 B1 * | 7/2006 | McInerney et al. | 356/71 |
| 2004/0239291 A1 * | 12/2004 | Watanabe | 320/106 |
| 2004/0251907 A1 | 12/2004 | Kalley | |
| 2005/0001629 A1 | 1/2005 | Chen | |
| 2005/0095715 A1 | 5/2005 | Hubbard et al. | |
| 2005/0109951 A1 * | 5/2005 | Fish et al. | 250/461.1 |
| 2005/0109983 A1 | 5/2005 | Pai-Paranjape et al. | |
| 2005/0109984 A1 | 5/2005 | Potyrailo et al. | |
| 2005/0110978 A1 | 5/2005 | Polyrailo et al. | |
| 2005/0112768 A1 | 5/2005 | Evans et al. | |

FOREIGN PATENT DOCUMENTS

| | | |
|---|---|---|
| EP | 0 984 542 A2 | 3/2000 |
| EP | 0 636 661 B1 | 2/2005 |
| FR | 2 701 142 A1 | 2/1993 |
| GB | 2 264 558 A | 9/1993 |
| GB | 2 405 990 A | 3/2005 |
| JP | 05-163433 | 6/1993 |
| JP | 05-293433 | 9/1993 |
| WO | WO 03/006965 A1 | 1/2003 |

OTHER PUBLICATIONS

Patent Abstracts Of Japan. 02-146079. Publication Date Jun. 5, 1990. "Base Material For Heat Resistant Printing And Label And Method For Forming And Fixing Label". (Abstract Only).

Patent Abstracts Of Japan. 05-108011. Publication Date Apr. 30, 1993. "Adhesive Label Hiding Power". (Abstract Only).

Patent Abstracts Of Japan. 05-163433. Publication Date Jun. 29, 1993. "Production Of Colored Polyetherimide Resin Composition". (Abstract Only).

Patent Abstracts Of Japan 05-293433. Publication Date Nov. 9, 1993. "Surface Treated Steel Panel Excellent In Function After Painting". (Abstract Only).

Patent Abstracts Of Japan. 07-157581. Publication Date Jun. 20, 1995. "White Polyester Film". (Abstract Only).

Patent Abstracts Of Japan. 2004071243 A. Publication Date Mar. 4, 2004. "Battery Pack". (Abstract Only).

Patent Abstracts Of Japan. 2004196287. Publication Date Jul. 15, 2004. "Rear Panel Part Of Automobile". (Abstract Only).

Patent Abstracts Of Japan. 2005-117858. Publication Date Apr. 28, 2005. "Motor". (Abstract Only).

Kronos International, Inc. "Kronos 1080 Titanium Dioxide", *Kronos Information 2.2.*, 1996. 1 Page.

U.S. Appl. No. 10/709,208, filed Apr. 21, 2004, David Gascone., Authentication System, Data Device, and Methods for Using the Same. (available in IFW).

U.S. Appl. No. 10/889,913, filed Jul. 13, 2004, Sriramakrishna Maruvada, Authenticatable Article and Method of Authenticating (available in IFW).

Aldrich, "Advanced Polymers for Electronic/Optical Devices", *ChemFiles*, New Additions For 2004, vol. 3 No. 8, pp. 1-15 [Retrieved on Jan. 24, 2007]. Retrieved from the Internet: URL: http://www.sigmaaldrich.com/aldrich/brochure/al_chemfile_v3_No. 8.

DuPont, "Why Use $TiO_2$?", *Dupont The Miracles Of Science*, pp. 1-2. 2005 [Retrieved on Aug. 31, 2005]. Retrieved from the Internet: URL: http://www.specialchem4polymers.com/tc/Titanium-Dioxide/.

Sigma-Aldrich, "Photoluminescent Small Molecules Display & Photovoltaic Materials", pp. 1-24, 2005, [Retrieved on Sep. 12, 2005]. Retrieved from Internet: URL: http://www.sigmaaldrich.com/Area_of_Interest/Chemistry/Materials_Science/Display_and_Optoelectronics/Photolum_Sm_Molecules.html.

International search report PCT/US2006/037655, International filing date Sep. 27, 2006, Date of mailing Jan. 17, 2007 not a publication.

* cited by examiner

☐ Chip 1 - White Light
■ Chip 2 - White Light

FIG. 6

☐ Chip 1 - UV Light
■ Chip 2 - UV Light

DEVICES AND METHODS CAPABLE OF AUTHENTICATING BATTERIES

BACKGROUND OF THE INVENTION

The unauthorized reproduction of consumer electronic products, data storage media, medical devices, and telecom products, as well as several other products, is increasing. Attracted to these industries due to impressive sales volumes and potentially high revenues, unauthorized manufactures are capable of flooding the market with counterfeit products that are difficult for consumers, and in some cases, even manufacturers, to distinguish from authentic products. As a result consumers and manufacturers are detrimentally impacted by these often poor-quality counterfeits. Consumers that take receipt of these reproductions often experience inferior and/or faulty performance. As an example, the United States Consumer Product Safety Commission has reported that one cellular telephone manufacturer was forced to recall over 50,000 products from April of 2001 to November of 2003 due to consumers' complaints of product damage caused by counterfeit batteries that reportedly overheat. In yet another example, another cellular telephone manufacturer recalled over 1,000,000 units sold between December 2002 and September 2004, again due to counterfeit batteries overheating.

In addition to the obvious consumer dissatisfaction, manufacturers whose products are reproduced also suffer from the effects of counterfeiting with loss of sales revenues and, even more importantly, the degradation of brand image as a result of perceived inferior product performance.

In order to circumvent counterfeiting, manufacturers have employed many authentication methods. One such method comprised the employment of laser printed and/or holographic labels. Although such labels posed a technical hurdle to counterfeiting, unauthorized manufacturers were able to produce labels indistinguishable from the originals. In another example, anti-piracy circuits have been added to data storage media in order to hinder counterfeiting. In this example as well, unauthorized manufacturers have been able to integrate the electronic anti-piracy circuits into the counterfeit products, rendering the products indistinguishable during supply chain authentication testing.

Due to the detrimental effects on consumers and manufacturers by counterfeit products, a need remains for additional authentication methods that can protect consumers and manufacturers. Disclosed herein are devices and methods for authenticating batteries.

SUMMARY

This disclosure relates to authentication systems and methods for battery authentication.

In one embodiment, a device comprises, a battery, an excitation source, a photodetector, and an operating system. The device is capable of at least partially being powered by the battery. The excitation source is capable of producing radiation and disposed so that the radiation can contact a surface of the battery. The photodetector capable of detecting radiation from the battery. The operating system is capable of determining whether or not the battery is an authentic battery for that device.

In one embodiment, a phone comprises, a battery, a transceiver, an excitation source, a photodetector, and an operating system. The transceiver is capable of transmitting and receiving communications. The excitation source is capable of producing radiation and disposed so that the radiation can contact a surface of the battery. The photodetector is capable of detecting radiation emission from the battery. The operating system is capable of determining whether or not the battery is an authentic battery based on whether the battery produces an expected radiation signature.

In one embodiment, a method of authenticating a battery comprises, irradiating a surface of the battery, monitoring for radiation emitted from the surface to form a monitoring result, producing an electrical communication correlating to the monitoring result; comparing the electrical communication to stored data, and determining if the battery is authentic.

The above described and other features are exemplified by the following figures and detailed description.

BRIEF DESCRIPTION OF THE DRAWINGS

Refer now to the figures, which are exemplary embodiments.

DETAILED DESCRIPTION

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). The notation "±10%" means that the indicated measurement may be from an amount that is minus 10% to an amount that is plus 10% of the stated value. The modifier "about" used in connection with a quantity is inclusive of the stated value and has the meaning dictated by the context (e.g., includes the degree of error associated with measurement of the particular quantity).

Disclosed herein are battery-powered devices capable of authenticating the batteries which they employ, for the purposes of discouraging unauthorized duplication of batteries and the use of counterfeit batteries. Such a system can be employed in any device that employs a battery and/or is at least partially powered by a battery, such as, but not limited to, medical equipment, communication devices (e.g., cellular phones (cell phones), radio transmitters and receivers (such as walkie-talkies), pagers, and the like), computers (e.g., laptop computers, and the like), vehicles (e.g., automobiles, trucks, planes, and the like), toys, personal digital assistants (PDAs), cameras (e.g., digital cameras, video cameras, and the like), calculators, personal entertainment systems (e.g., video games, audio players (e.g., music players, personal digital book readers, radios, MP3 players, and the like), video players (e.g., personal digital video disc players, and the like)), and the like. Although applicable in any device, for clarity and simplicity, the following discussion will focus on authentication systems for use in cellular telephones, but is just as applicable to and is intended to include all of the above battery-powered devices.

Authentication of a battery can be accomplished by integrating a spectroscopic tag into, and/or on, the battery's polymer shell, which can be evaluated by the device (e.g., cellular phone) in which it is employed to determine the authenticity of the battery. To be more specific, a spectroscopic tag capable of producing a differentiable spectroscopic response, as compared to an un-tagged and/or inaccurately tagged material, can be dispersed within and/or disposed on a cellular telephone battery. A phone that employs the battery can be capable of testing the battery's authenticity by energizing an excitation source in radiative communication with at least a portion of the tagged battery's polymer shell (e.g., in an authentic battery) and evaluating the emissions from the tagged battery utilizing a photodetector. The photodetector can be capable of producing feedback (e.g., an electrical signal) that can be evaluated by an authentication program within the phone's operating system to determine the authenticity of the battery.

Spectroscopic tags can be any material that can produce a predictable, identifiable emission when excited by the excitation source. For example, a spectroscopic tag can absorb radiation at one frequency, and emit a response (e.g., light) at a different frequency. These materials can be classified by the amount of frequency shift they attain, namely, long Stokes shift (e.g., a shift of greater than or equal to 50 nm), short Stokes shift e.g., a shift of less than 50 nm), and anti-Stokes shift materials.

Selection of a spectroscopic tag will be dependent upon the application and design. In applications in which the spectroscopic tag is to be melt processed within a polymer, applicable heat resistance is desirable. For many thermoplastics a heat resistance of greater than or equal to about 200° C. (degrees Celsius) is desirable. However, for thermoplastics with higher melting temperatures, heat resistance of greater than or equal to about 300° C. is desirable. Even more specifically, in high temperature applications heat resistance of over 400° C. can be desirable. It is to be apparent, however, that the carrier of the tag (e.g., the battery's polymer shell) is not limited to a thermoplastic. Other possible materials include thermosets, sintered materials, cast materials, and the like. Also included are combinations comprising at least one of the foregoing materials.

Applicable spectroscopic tags (also referred to herein as "tags") can comprise materials such as, but not limited to, luminescent (e.g., fluorescent, phosphorescent, and the like) dyes, luminescent nanoparticles/pigments, fluorophore modified compounds, photoluminescent polymers, and the like, as well as combinations comprising at least one of the foregoing.

Fluorescent dyes are capable of absorbing higher-energy wavelengths and emitting lower-energy wavelengths. Exemplary fluorescent dyes comprise materials such as, but not limited to, polyazaindacenes, coumarins, lanthanide complexes, hydrocarbon and substituted hydrocarbon dyes, polycyclic aromatic hydrocarbons, scintillation dyes (e.g., oxazoles and oxadiazoles), aryl- and heteroaryl-substituted polyolefins ($C_2$-$C_8$ olefin portion), carbocyanine dyes, phthalocyanine dyes, oxazine dyes, carbostyryl dyes, porphyrin dyes, acridine dyes, anthraquinone dyes, anthrapyridone dyes, naphtalimide dyes, benzimidazole dyes, arylmethane dyes, azo dyes, flavone dyes, chromone dyes, diazonium dyes, nitro dyes, quinone imine dyes, tetrazolium dyes, thiazole dyes, perylene dyes, perinone dyes, bisbenzoxazolylthiophene (BBOT) dyes, xanthene dyes (e.g., thioxanthene dyes), indigoid dyes (e.g., thioindigoid dyes), and the like, as well as derivatives comprising at least one of the foregoing, and combinations comprising at least one of the foregoing.

The following is a partial list of some fluorescent and/or luminescent dyes comprises; 5-amino-9-diethyliminobenzo (a)phenoxazonium perchlorate7-amino-4-methylcarbostyryl, 7-amino-4-methylcoumarin, 7-Amino-4-trifluoromethylcoumarin, 3-(2'-benzimidazolyl)-7-N,N-diethylaminocoumarin, 3-(2'-benzothiazolyl)-7-diethylaminocoumarin, 2-(4-biphenylyl)-5-(4-t-butylphenyl)-1,3,4-oxadiazole, 2-(4-biphenylyl)-5-phenyl-1,3,4-oxadiazole, 2-(4-biphenyl)-6-phenylbenzoxazole-1,3, 2,5-Bis-(4-biphenylyl)-1,3,4-oxadiazole, 2,5-bis-(4-biphenylyl)-oxazole, 4,4'-bis-(2-butyloctyloxy)-p-quaterphenyl, p-bis(o-methylstyryl)-benzene, 5,9-diaminobenzo(a)phenoxazonium perchlorate, 4-dicyanomethylene-2-methyl-6-(p-dimethylaminostyryl)-4H-pyran, 1,1'-diethyl-2,2'-carbocyanine iodide, 1,1'-diethyl-4,4'-carbocyanine iodide, 3,3'-diethyl-4,4',5,5'-dibenzothiatricarbocyanine iodide, 1,1'-diethyl-4,4'-dicarbocyanine iodide, 1,1'-diethyl-2,2'-dicarbocyanine iodide, 3,3'-diethyl-9, 11 -neopentylenethiatricarbocyanine iodide, 1,3'-diethyl-4,2'-quinolyloxacarbocyanine iodide, 1,3'-diethyl-4,2'-quinolylthiacarbocyanine iodide, 3-diethylamino-7-diethyliminophenoxazonium perchlorate, 7-diethylamino-4-methylcoumarin, 7-diethylamino-4-trifluoromethylcoumarin, 7-diethylaminocoumarin, 3,3'-diethyloxadicarbocyanine iodide, 3,3'-diethylthiacarbocyanine iodide, 3,3'-diethylthiadicarbocyanine iodide, 3,3'-diethylthiatricarbocyanine iodide, 4,6-dimethyl-7-ethylaminocoumarin, 2,2'-dimethyl-p-quaterphenyl, 2,2-dimethyl-p-terphenyl, 7-dimethylamino-1-methyl-4-methoxy-8-azaquinolone-2,7-dimethylamino-4-methylquinolone-2,7-dimethylamino-4- trifluoromethylcoumarin, 2-(4-(4-dimethylaminophenyl)-1,3-butadienyl)-3-ethylbenzothiazolium perchlorate, 2-(6-(p-dimethylaminophenyl)-2,4-neopentylene-1,3,5-hexatrienyl)-3-methylbenzothiazolium perchlorate, 2-(4-(p-dimethylaminophenyl)-1,3-butadienyl)-1,3,3-trimethyl-3H-indolium perchlorate, 3,3'-dimethyloxatricarbocyanine iodide, 2,5-diphenylfuran, 2,5-diphenyloxazole, 4,4'-diphenylstilbene, 1-ethyl-4-(4-(p-dimethylaminophenyl)-1,3-butadienyl)-pyridinium perchlorate, 1-ethyl-2-(4-(p-dimethylaminophenyl)-1,3-butadienyl)-pyridinium perchlorate, 1-ethyl-4-(4-(p-dimethylaminophenyl)-1,3-butadienyl)-quinolium perchlorate, 3-ethylamino-7-ethylimino-2,8-dimethylphenoxazin-5-ium perchlorate, 9-ethylamino-5-ethylamino-10-methyl-5H-benzo(a)phenoxazonium perchlorate, 7-ethylamino-6-methyl-4-trifluoromethylcoumarin, 7-ethylamino-4-trifluoromethylcoumarin, 1,1',3,3,3',3'-Hexamethyl-4,4',5,5'-dibenzo-2,2'-indotricarboccyanine iodide, 1,1',3,3,3',3'-Hexamethylindodicarbocyanine iodide, 1,1',3,3,3',3'-Hexamethylindotricarbocyanine iodide, 2-methyl-5-t-butyl-p-quaterphenyl, N-methyl-4-trifluoromethylpiperidino-<3,2-g>coumarin, 3-(2'-N-methylbenzimidazolyl)-7-N,N-diethylaminocoumarin, 2-(1-naphthyl)-5-phenyloxazole, 2,2'-p-phenylen-bis(5-phenyloxazole), 3,5,3'''',5''''-tetra-t-butyl-p-sexiphenyl, 3,5,3'''',5''''-tetra-t-butyl-p-quinquephenyl, 2,3,5,6-1H,4H-tetrahydro-9-acetylquinolizino-<9,9a,1-gh>coumarin, 2,3,5,6-1H,4H-tetrahydro-9-carboethoxyquinolizino-<9,9a,1-gh>coumarin, 2,3,5,6-1H,4H-tetrahydro-8-methylquinolizino-<9,9a,1-gh>coumarin, 2,3,5,6-1H,4H-tetrahydro-9-(3-pyridyl)-quinolizino-<9,9a,1-gh>coumarin, 2,3,5,6-1H,4H-tetrahydro-8-trifluoromethylquinolizino-<9,9a,1-gh>coumarin, 2,3,5,6-1H,4H-tetrahydroquinolizino-<9,9a,1-gh>coumarin, 3,3',2'',3'''-tetramethyl-p-quaterphenyl, 2,5,2'''',5'''-tetramethyl-p-quinquephenyl, p-terphenyl, p-quaterphenyl, nile red, rhodamine 700, oxazine 750, rhodamine 800, IR 125, IR 144, IR 140, IR 132, IR 26, IR5, diphenylhexatriene, diphenylbutadiene, tetraphenylbutadiene, naphthalene, anthracene, 9,10-diphenylanthracene, pyrene, chrysene, rubrene, coronene, phenanthrene; and the like, as well as combinations comprising at least one of the foregoing.

Spectroscopic tags can also include luminescent (fluorescent and phosphorescent) nanoparticles and pigments. Exemplary luminescent materials include zinc sulfide, rare earth-doped strontium aluminates, rare earth oxide sulfides, alkaline earth sulfides, silicates, tungstates, hexa-aluminates, phosphates, organic heterocyclic compounds, phthalocyanine pigments, semi-conducting nanoparticles also referred to as "quantum dots" (e.g., CdSe, CdTe, CdS, ZnS, $Cd_3P_2$, PbSe, and the like, including core-shell particles such as CdSe/ZnS, CdTe/CdS, InGaP/ZnS and the like, such as those commercialized by Evident Technologies, Troy, N.Y., USA); and the like, as well as combinations comprising at least one of the foregoing. Moreover, any compound comprising a fluorophore can be utilized as a spectroscopic tag. Fluorophores can comprise organic, inorganic, and organometallic structures that can be added to any compound to enable fluorescence. Exemplary fluorophores comprise polyazaindacenes, coumarins (including those set forth in U.S. Pat. No. 5,573,909); fluorescein, isothiocyanate, tryptophan, and aequorin. A partial list of fluorophores comprises; 1-(4-Methoxyphenyl)-6-phenylhexatriene, 1-(4-Nitrophenyl)-6-phenylhexatriene, 1-(Ethoxycarbonylmethyl)-6-methoxyquinolinium bromide, 1,1'-Dibutyl-3,3,3',3'-tetramethylindocarbocyanine iodide, 1,3-Cyclohexanedione purum, 11-(1-Pyrenesulfonylamino)undecanoic acid, 1-Methylpyrene, 1-Pyrenedecanoic acid, 2,3-Diaminonaphthalene, 3-(Dansylamino)phenylboronic acid, 3,3'-Dibutyloxacarbocyanine iodide, 3,4-Dimethylumbelliferone, 4-Chloro-7-nitrobenzofurazan, 4-Methylumbelliferyl acetate, 5-Maleimido-eosin, 7-Methoxycoumarin-3-carboxylic acid, Dansyl fluoride, Fluorescein dibutyrate, Fluorescein-5-thiosemicarbazide, N-(3-Fluoranthyl)maleimides, N'-Octadecylfluorescein-5-thiourea, Quinacrine Dihydrochloride, Resorufin methyl ether, Sulforhodamine B 2-acid fluoride, and the like, as well as combinations comprising at least one of the foregoing. Possible fluorophores include those commercially available from Sigma-Aldrich Inc., St. Louis, Mo., USA.

The spectroscopic tag can also comprise optically variable tags capable of changing in fluorescence intensity and/or wavelength as a function of time. These tags can be employed to limit the number of times battery can be authenticated. Optically variable tags can include, but are not limited to, oxadiazole derivatives, luminescent conjugated polymers, and the like. Illustrative examples of suitable luminescent conjugated polymers include poly-paraphenylenevinylene derivatives, and polyfluorene. Illustrative examples of suitable oxadiazole derivatives include oxadiazole derivatives substituted with a biphenyl or substituted biphenyl in the 2-position and with a phenyl derivative in the 5-position, for example, tert-butyl phenyl oxadiazole, bis(biphenylyl) oxadiazole. It is also envisioned that optically variable tags can have a fluorescence emission whose wavelength can shift from a first wavelength to a second wavelength with time. It is yet further envisioned that an optically variable tag can vary in fluorescence intensity with time.

Polymers with inherent photoluminescence can also be employed as spectroscopic tag(s) to provide authenticable characteristics. These polymers can be homopolymers, copolymers, or the like. Some examples of photoluminescent polymers comprise, but are not limited to, polyimides (e.g., Poly(3,3',4,4'-benzophenonetetracarboxylic dianhydride-alt-acridine yellow G), Poly((4,4'-hexafluoroisopropylidene)diphthalic anhydride-alt-thionin), Poly(pyromellitic dianhydride-alt-ethidium bromide), Poly(pyromellitic dianhydride-co-thionin), Poly(2-naphthylacrylate)), poly(phenylene ethynylenes) (e.g., Poly[9,9-di(3',7'-dimethyloctyl)fluoren-2,7-yleneethynylene]), polyfluorenes (e.g., Poly[9,9-di-(2'-ethylhexyl)fluorenyl-2,7-diyl]), polyacetylenes (e.g., Poly[1,2-bis(benzylthio)acetylene]), polypyridines (e.g., Poly(3,5 pyridine)), Polythiophenes, (e.g., 5,5'-Dibromo-2,2'-bithiophene, Poly(3-cyclohexylthiophene-2,5-diyl), Poly(3-dodecylthiophene-2,5-diyl), Poly(3-octylthiophene-2,5-diyl)), Thiophene Oligothiophenes (e.g., 2,2':5',2'',5'',2'''-Quaterthiophene, a-Sexithiophene, Thiophene, 3,2':5'3''-Terthiophene, and poly(phenylene vinylene) (e.g., Poly[2,5-bisoctyloxy)-1,4-phenylenevinylene], Poly[(m-phenylenevinlyene)-alt-(2-methoxy-5-octyloxy-p-phenylenevinylene)], Poly(p-xylene tetrahydrothiophenium chloride)), and the like. Although not necessary, it is desirable to hide the spectroscopic tag behind the absorption of the polymer in which it is disposed in and/or on to increase the difficulty of identifying the tag by unauthorized manufacturers. For example, if the polymer employed for the battery's shell comprises additives, colorants, layers, coatings, or the like, which combined possess a specific spectral absorption curve, if the spectroscopic tag's excitation wavelength is within these frequencies, its identification will be difficult as compared to if the tags excitation wavelength is not masked.

Furthermore, is desirable to have spectroscopic tags with peak excitation wavelengths outside the visible range, such as, in the ultraviolet range, and peak emissions in the visible or in the near infrared region of the spectrum. In an exemplary embodiment, the fluorescent tags are selected from the classes of long Stokes shift dyes that are excited by long ultraviolet wavelengths and emit in the visible spectrum.

The concentration of the spectroscopic tag in the composition depends on the tag(s) employed and the device employed for its identification (e.g., the excitation source and photodetector). The tag employed will comprise variables such as spectral efficiency, excitation wavelengths, emission wavelengths, and the like. In addition, the device employed for its detection will comprise variables associated with the excitation source and the photodetector. It is apparent that these variables will be considered for each specific application by those skilled in the art. However, spectroscopic tag concentrations can be present in an amount of about $1.0\times10^{-18}$ to about 20.0 weight percent (wt %), based upon a total weight of the polymer/tag composition, or, more specifically, the tag can comprise about $1.0\times10^{-10}$ wt % to about 2.0 wt %, and, even more specifically, about $1.0\times10^{-2}$ wt % to about 0.20 wt %.

Figures 1, 2, 3:
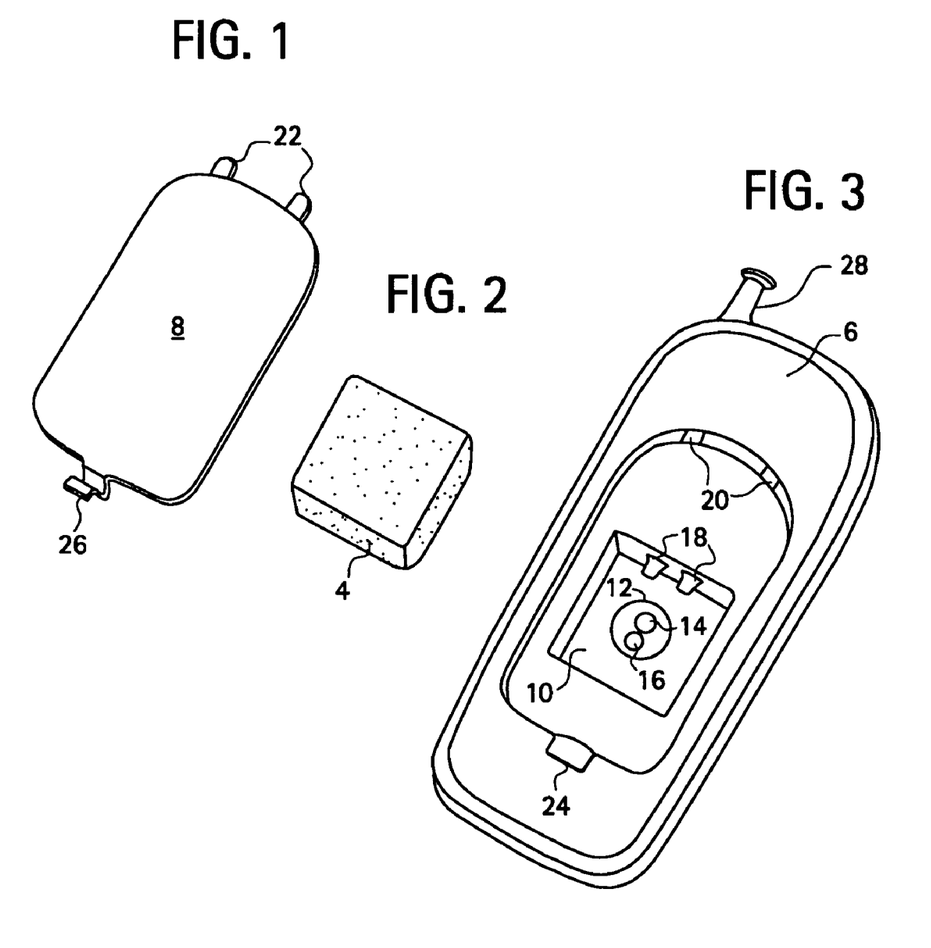
FIG. 1 is an oblique view of one embodiment of a cellular phone component, namely the battery cover.
FIG. 2 is an oblique view of one embodiment of a cellular phone component, namely the battery.
FIG. 3 is an oblique view of one embodiment of a cellular phone component, namely the handset.

Referring now to FIGS. 1-3, an oblique assembly view of a cellular phone's components are illustrated. The cellular phone comprises battery 4, which is enclosed in a battery shell, handset 6, and battery cover 8. Handset 6 comprises a battery socket 10 that is capable of accepting battery 4 which can be assembled therein. Disposed within the battery socket 10 can be a recess 12 in which an excitation source 14 and a photodetector 16 can be disposed. Also disposed within battery socket 10 are terminals 18.

Disposed on the handset 6 can be holes 20 capable of accepting tabs 22 disposed on the battery cover 8. Also, an undercut 24 can be disposed on the handset 6 that can accept snap-fit tab 26 disposed on battery cover 8. These features can provide for the assembly and disassembly of the battery cover 8 to handset 6 for the removal and replacement of battery 4.

In this specific embodiment, the cellular phone is capable of operating as a cellular telephone, and capable of authenticating the battery 4 employed by the device. Cellular communications can be enabled through the integration of a transceiver (e.g., analog or digital) that is capable of communicating with cellular service networks and the like. The range of the transceiver can be increased by utilizing an optional antenna 28, which can be operably connected to the transceiver. The capability of authenticating the battery 4 employed by the phone can be accomplished by employing an excitation source 14 capable of irradiating the battery 4, and a photodetector 16 capable of evaluating the spectroscopic emission of battery 4. Furthermore, the battery 4 can comprise a spectroscopic tag that is capable of producing a distinguishable emission once excited. More specifically, when assembled, at least a portion of the battery's shell can comprise a spectroscopic tag that can be illuminated and excited by an excitation source 14. A photodetector 16 can be employed to detect the spectroscopic emission, if any, from the battery's shell. Photodetector 16 is also capable of producing an electrical signal indicative of the emission detected. The electrical signal (also referred to herein as electrical communication) can then be utilized by an authentication program (e.g., within an operating system, within the handset 6, a powering base (not shown), as well as combinations comprising at least one of the foregoing). The authentication program can compare the electrical communication to an authentic signal range. If the photodetector's electrical communication is in the authentic signal range, the battery is identified as authentic. If the photodetector's electrical communication is outside the authentic signal range, the battery is identified not authentic.

The battery's polymer shell can comprise any of the spectroscopic tags discussed herein in any combination and/or composition. In addition, the polymer shell can also comprise colorants, additives, and/or fillers that can provide visual characteristics usable for authentication purposes, such as, color-shifting pigment, Lapis pigments, thermochromic pigments, optical brighteners, and the like. It is further envisioned that visual evaluation (e.g., naked eye, magnification, and the like) or analytical methods (e.g., ultraviolet spectrophotometer, infrared spectrophotometer, UV light, electronic detectors, and the like) can also be used for authentication. Exemplary additives include antioxidants, fillers, reinforcing agents, processing aids, mold release agents, stabilizers (e.g., light, thermal, UV, and the like), lubricants, plasticizers, anti-static agents, blowing agents, flame retardants, impact modifiers, and the like, as well as combinations comprising at least one of the forgoing. Exemplary fillers include minerals, carbon, talc, silica, calcium carbonate, and the like, as well as combinations comprising at least one of the foregoing.

Alternatively, or in addition to integrating a spectroscopic tag into the polymer, the spectroscopic tag can be disposed as a coating, spot, or the like, on a surface of the battery's 4 shell (e.g., to mark shells that have already been produced). In this embodiment, the spectroscopic tag can be disposed in a carrier (e.g., a binder, polymer, and the like) and applied to the shell in a desired location. The application process can comprise painting, spray deposition, dip coating, printing or the like. The tag may also be incorporated in a label that can be affixed to the surface of the battery in a desired location. Hence, the spectroscopic tag can be combined with the material forming the battery shell, and/or disposed on the surface of the battery shell. If the spectroscopic tag is both combined with the shell material and disposed on the surface, different spectroscopic tags can be used in each location.

It is also envisioned that the battery shell can comprise a configuration in which the excitation source 14 can emit radiation through at least a portion of the battery shell which can then be detected by the photodetector 16 configured and/or oriented to detect the response (i.e. transmission of the radiation through the tagged shell). For example, a battery 4 can comprise a portion that extends from a surface of the battery that can be configured to extend into a cavity formed between an excitation source 14 and a photodetector 16.

The battery shell can be any material that is stable in the operating environment of the battery shell to provide the desired structural integrity. Desirably, the material provides dielectric protection, impact resistance (e.g., dropped during use), and structural integrity. Examples of materials include, amorphous, crystalline, and/or semi-crystalline thermoplastic materials, such as: polyvinyl chloride, polyolefins (e.g., polyethylene, chlorinated polyethylene, polypropylene, and the like), polyesters (e.g., polyethylene terephthalate, polybutylene terephthalate, polycyclohexylmethylene terephthalate, and the like), polyamides, polysulfones, polyimides, polyether imides, polyether sulfones, polyphenylene sulfides, polyether ketones, polyether ether ketones, ABS resins, polystyrenes, polycyclohexyl ethylene, styrene-co-acrylonitrile, styrene-co-maleic anhydride, polybutadiene, polyacrylates (e.g, polymethylmethacrylate, methyl methacrylate-polyimide copolymers, and the like), polyacrylonitrile, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, polytetrafluoroethylene, as well as thermosetting resins such as epoxy, phenolic, alkyds, polyester, polyimide, polyurethane, siloxanes, bis-maleimides, cyanate esters, vinyl, and benzocyclobutene resins, in addition to blends, copolymers, mixtures, reaction products, and composites comprising at least one of the foregoing. Non-limiting examples of such polymers include polycarbonate, polycarbonate-siloxane copolymers, transparent cyclic polyolefins, polyacrylates (such as those offered by ARKEMA, King of Prussia, Pa. for optical media applications) and transparent polycarbonate-polyester blends, as well as combinations comprising at least one of the foregoing polymers, such as Xylex™ polycarbonate/polyester blend (commercially available from GE Plastics, Pittsfield, Mass.).

The battery's shell is envisioned as being produced utilizing an injection molding process. However, any process can be employed, such as, molding, casting, machining, coating, and the like. The spectroscopic tag can be combined with the polymer prior to forming the shell, such as in masterbatch and/or masterblend processes. A masterbatch includes the process of dispersing an additive (e.g. pigment, dye, filler, stabilizer, processing aid, antimicrobial, and the like) in a carrier (e.g., thermoplastic, and the like) utilizing melt-processing equipment (e.g., batch mixers, continuous mixers, extruder (e.g., twin screw compounding extruder, single screw extruder), and the like). This process produces a material (e.g., in the form of pellets, beads, film, and the like) with the additive homogeneously dispersed therein. The desired amount of material of the masterbatch can be added to a polymer (e.g., base resin) to form the shell material. For example, as the pellets or beads are melt processed, the additive is dispersed within the base resin, producing a resulting product with the desired loading of the additive.

Masterblends can also be produced with a desired loading of additives that do not require subsequent mixing with a base resin (i.e., masterblends are the carrier). These compounds are generally produced on continuous melt processing equipment, wherein the base resin and additives are fed directly into the machine. The result is pellets or beads that comprise the specific concentration of the additive. These pellets or beads can then be utilized to form the shell without having to be blended with a base resin.

As illustrated in FIGS. 1-3, this embodiment comprises a recess 12 in which the excitation source 14 and the photodetector 16 can be disposed. Although this feature is optional, a recess 12 can permit the emissions from excitation source 14 to contact the entire surface area above the recess 12 and allow photodetector 16 to evaluate a larger surface area. Other methods can be employed such as light tubes, and the like, to direct the excitation to a desired area of the battery shell, and/or to retrieve the emission from the shell.

Excitation source 14 can comprise any element capable of emitting radiation at a wavelength that will excite the authentic spectroscopic tag (visible, UV (ultraviolet), infrared, and the like). Exemplary excitation sources can comprise light emitting diodes (LED) (e.g., ultraviolet LEDs, violet LEDs, blue LEDs, white LEDs, and the like), incandescent lights (e.g., tungsten, glass halogen, quartz halogen, tungsten-halogen, and the like), fluorescent lights (e.g., cold cathode fluorescent lamps, and the like), high intensity discharge lamps (mercury vapor, sodium, metal halide, and the like), lasers (e.g., gas, excimer, laser diodes, neodymium-doped yttrium aluminum, helium silver, and the like), and the like, as well as combinations comprising at least one of the foregoing. However, due to the desirability of compact cellular devices, it is desired that the excitation source 14 be compact in size. The specific configuration of the excitation source 14 can vary based on many variables such as spectral efficiency, excitation wavelengths, emission wavelengths, and the like. For simplicity, the excitation source can comprise the radiation sources currently available in the device in which the battery is employed (e.g., a video camera light source, a laptop display, a cellular telephone display, a personal digital assistant display, a personal entertainment system display, radiation sources to provide illumination of a user interface (e.g., keyboards, touch-screens, controllers, keypads, and the like), illuminations for attracting user attention (e.g., ring illuminations on cell phones), low-battery status indicators (e.g., cell phones, laptops, PDA, MP3 players and the like), and the like, as well as combinations comprising at least one of the foregoing. It is also envisioned however, that the illumination source can be a component of a separate device, such as a dock for a laptop or a changing station for any portable device.

In one embodiment, a UV-LED can be employed to excite a long-Stokes shift tag disposed within the battery's polymer shell. In yet another embodiment, the cellular phone can comprise more than one excitation source 14 enabling the capability of measuring multiple authenticable characteristics, e.g., multiple emissions by the same or different tags. These excitation sources 14 can be configured in any orientation and can be employed in any order (i.e., simultaneously or subsequently) to provide for authentication. For example, one embodiment can be configured with a white LED and a UV-LED. The white LED can be employed to illuminate the surface of the battery 4 so that photodetector 16 can measure the color characteristics of the battery's 4 color (e.g., lightness, redness, blueness, chroma, hue, and the like), and the UV-LED can irradiate a spectroscopic tag either simultaneously or subsequently.

In another embodiment, the excitation source 14 can be configured to allow for a desirable lighted effect as the cellular phone rings, is turned on, charged, and/or the like. In other words, the excitation source can provide an additional function in the device, such as illuminating a display, data storage medium, and/or subject. In this configuration it is contemplated that these illumination sources can be employed as an excitation source 14. If the position of the illumination sources is not conducive for providing an effective excitation source 14, optical features and/or elements can be employed to direct the light produced for more effective operation. These optical features can include, but are not limited to, light pipes, optical fiber, wave guides, reflectors, and the like, as well as combinations comprising at least one of the foregoing.

Photodetector 16 can be a device capable of measuring the photovoltaic effect of any of the battery's spectral properties. The photodetector 16 can comprise any spectroscopic detector capable of measuring the spectral emissions of an authentic spectroscopic tag employed in the battery shell, and creating a signal (e.g., electrical signal, or the like) that is representative of the detected emission. Exemplary devices can comprise, but are not limited to, photodiodes (e.g., filtered photodiodes, silicon photodiodes, and the like), photoresistors (e.g., CdS, GeCu, and the like), photovoltaic cells, photomultiplier tubes, charge coupled devices (CCD), light to frequency converters, and the like, as well as combinations comprising at least one of the foregoing. For example, photodetector 16 can be capable of producing an electrical output (such as an analog electrical output) if a specific wavelength is detected. The electrical output (i.e. electrical communication) is then utilized by the authentication program to determine authenticity of the battery 4. Since most cell phones currently incorporate a digital camera, it is also conceivable to use the camera's photodetector (typically a CCD) for detecting the battery's spectral properties in response to the illumination from the excitation source.

Optionally, a clear (i.e., unfiltered) photodiode can be employed to detect visible color across a broad spectrum, e.g., about 380 nm to about 740 nm. This can enable the detection of subtle visible characteristics, such as, but not limited to, light colorants and/or coloring effects, metal effects, reflective additives and/or layers, and/or luminescence, and the like, as well as combinations comprising at least one of the foregoing.

In addition, photodetector 16 can comprise filters such that emissions are detected within a specific wavelength band or at a particular wavelength. Any suitable filter may be employed and can be chosen based upon the desired accuracy and type of photodetector 16 and/or particular tag employed. For example, the filter can be a 10 nanometers (nm) bandpass filter that is capable of filtering emissions only within a specific bandwidth (e.g., about 480 nm to about 490 nm, or about 550 nm to about 560 nm, and the like). Another exemplary filter can be a specific bandwidth filter capable of allowing specific wavelengths to be detected, such as, a 20 nm bandwidth filter, a 30 nm bandwidth filter, a 40 nm bandwidth filter, a 60 nm bandwidth filter, or the like. Another exemplary filter that can be utilized is a narrow band filter, which allows only specific wavelengths pass through the filter, for example, 520 nm ±10 nm. Another exemplary filter that can be employed is a infrared/near-infrared wavelength filter, which can filter out all wavelengths in these bands.

It is envisioned that the authentication system can comprise one or more photodetectors 16 configured in any orientation, configuration, and/or multiplicity that will enable the authentication of the battery 4. If more than one photodetector 16 is employed, it is desirable to employ photodetectors 16 that can detect different radiation spectra. For example a RGB (red-green-blue) photodiode array can be employed to comprise a color filter capable of detecting the visible color of battery 4, wherein the visible radiation spectrum is about 380 nm to about 740 nm. In another example, a photodetector 14 (comprising an RGB photodiode array) and a white LED excitation source 14 can be disposed in a first recess 12. In a second recess 12 a filtered ultraviolet photodiode photodetector 16 and UV-LED excitation source 14 can be disposed. In this configuration, the RGB photodetector 16 can be capable of detecting the visible light emission characteristics of the battery 4 and the filtered photodetector 16 can be capable of measuring the ultraviolet emission characteristics of the battery 4.

The cellular telephone can comprise an operating system that is capable of controlling some, or all, functions of the device (e.g., cellular communications, user interface, memory, cellular scanning, battery management) and/or a component (e.g., a switch) that turns on upon detecting a signal. For example, the operating system can comprise an authentication program capable of controlling the operation of the excitation source 14 and the photodetector 16 (e.g., when to energize, duration of detection, etc.), as well as carrying out authentication of the battery. It is envisioned that the operating system can be disposed within the handset 6 and/or the battery charger (not shown). Hence, controlling of the device includes sending a signal to the device.

More specifically, authentication can be accomplished by comparing the electrical communications of photodetector 16 with a predetermined range. More specifically, it is envisioned that the electrical communications with photodetector 16 can be compared with a range of acceptable values. If the electrical communications are within this range, the authentication program will determine that battery 4 is authentic and can thereafter optionally execute additional programming, such as providing user feedback (e.g., display a notification), and/or storing the electrical communications. Alternatively, if the electrical communications with photodetector 16 are not within the acceptable range, the authentication program can determine the battery 4 to be counterfeit and thereafter optionally execute additional programming, such as, providing user feedback (e.g., display a warning, or the like), shutting down the cellular phone 2, automatically advising the manufacturer of the presence of the counterfeit battery, and the like, as well as combinations comprising at least one of the foregoing. It is envisioned that the authentication system can be triggered to authenticate the battery 4 when it is replaced or removed, by sensing the interruption in connectivity between the battery 4 and the terminals 18. In order to enhance the accuracy of the authentication determination, environmental and/or other conditions can be taken into consideration. For example, a temperature sensor (e.g., a termistor) can be employed such that the ambient temperature at which the emission is obtain can be factored into the expected fluorescence intensity (e.g., used in the algorithm). Another possible condition is the age of the battery (and hence the age of the tag).

To be even more specific, the authentication program can exist in the form of programming or circuitry within the operating system. It is envisioned that handset 6 can comprise any device capable of enabling the operating system such as, but not limited to, a processor(s), a computer(s), a controller(s), or the like, and employ memory, storage, register(s), timing, interrupt(s), communication interface(s), and/or input/output signal interfaces, and the like, as well as combinations comprising at least one of the foregoing. Furthermore, handset 6 can be capable of input signal processing and filtering capabilities that enable accurate sampling and conversion of acquisitions of such communications from various photodetectors 16. Furthermore, any additional measurements can be used to authenticate battery 4, such as, but not limited to, voltage, amperage, resistance, inductance, capacitance, magnetism, conductivity, and/or the presence of an authentication circuit, and the like. Once the authentication program has determined whether or not a battery is authentic, it can allow the cell phone to operate (authentic battery), or, if the battery is counterfeit, the program can cause the cell phone to fail to operate, shut off, display a warning, lock in a warning mode, locking the cell phone from use (e.g., until the battery has been replaced), signal a need for service, fail to power the cell phone on, fail to charge the battery, send a cell phone message (for example, send the cell phone's serial number and/or other identifier to the manufacturer and/or another party, otherwise utilize the knowledge that the battery is counterfeit, or a combination of actions, comprising at least one of the foregoing.

Referring to FIGS. 2 and 3, one or more excitation sources 14 and photodetectors 16 can be employed to measure various authentic characteristics of the battery 4. In addition, several alternative embodiments are contemplated that can also enable the authentication of battery 4. In a first alternative embodiment, if the cellular phone comprises a digital camera, the camera's CCD (charge coupled device) can be employed as a photodetector 16 to detect the visible radiation characteristics of the battery 4. Furthermore, if the architecture of the cellular phone is not conducive to disposing the camera's CCD in the desired proximity to battery 4 to enable the camera to function and to enable the irradiation of the battery, optical features and/or elements can be employed to maintain the function of the camera's CCD (that is, to take pictures), while enabling the CCD to also illuminate the battery. Possible optical features and/or elements include, but not limited to, light pipe(s), optical fiber(s), wave guide(s), and reflector(s).

During use of the device (e.g., the phone), authentication of the battery 4 can comprise irradiating a surface of a battery 4. The surface can be monitored with the photodetector for radiation emitted from the surface. The monitoring result will depend upon whether there was or was not an emission. An electrical communication can be produced correlating to the monitoring result and compared to stored data to determine if the battery 4 is authentic. In order to enhance the accuracy of the authentication, if an emission is detected, the electrical communication can correlate to the spectral characteristics of the emission. As noted above, if the battery is authentic, the operating system can allow the device to use the battery and/or the battery can be allowed to charge, as is applicable. If the battery is not authentic, the operating system can control the device, for example, so as to preventing the device from operating, shutting off the device, displaying a warning, locking the device from use, locking the device in a warning mode, signaling a need for service, failing to power the device on, failing to charge the battery, sending a message to the manufacturer, and a combination comprising at least one of the foregoing.

EXAMPLES

Example 1

Resin to be used in battery pack applications was prepared in three typical colors (gray, black, and white) in a base polycarbonate-acrylonitrile butadiene styrene (PC-ABS) resin. A long Stokes shift fluorophore, namely Lumilux™ CD309OL of the benzimidazole family (commercially available from Specialty Chemicals Seelze GmbH, a subsidiary of Honeywell International Inc.), was used to create the tagged resin. Details of the formulations are given in Tables 1 and 2 below.

TABLE 1

| Component | Details | Source |
| --- | --- | --- |
| PC-1 | Lexan ® CO23A; 100 grade polycarbonate with $M_w$ 29,900 daltons | GE Plastics |
| PC-2 | Lexan ® CO17; High flow polycarbonate with $M_w$ of 21,800 daltons | GE Plastics |
| PC-ST | Lexan ® C 9030P; PC-siloxane copolymer | GE Plastics |
| B-ABS | Bulk ABS comprising 16% rubber, balance styrene/acrylonitrile | GE Plastics |

TABLE 1-continued

| Component | Details | Source |
|---|---|---|
| TSAN | Antidrip agent comprising 50 wt % polystyrene-acrylonitrile and 50 wt % polytetrafluoroethylene | GE Plastics |
| DMBPC-PC | Lexan ® C891182; dimethyl bisphenol cyclohexane - polycarbonate copolymer | GE Plastics |
| BPA-DP | Bisphenol A bis(diphenyl phosphate) | Akzo Nobel |
| Mold release | pentaerythritol tetrastearate | Lonza |
| Antioxidant | Irganox ™ 1076; Octadecyl-3-(3,5-di-tert.butyl-4-hydroxyphenyl)-propionate | Ciba-Geigy |
| Stabilizer | Irgafos ™ 168; 2,4-di-tert-butylphenol phosphite (3:1) | Ciba-Geigy |
| $TiO_2$ | Titanium dioxide | Dupont |
| CD 309 OL | Honeywell Lumilux ™ Green fluorophore | Seelze GmbH |
| R721 | Pigment Blue 29/GT-58 | Nubiola |
| R201/R203 | Pigment Black 7 | Degussa |
| R71 | Solvent Violet 13/Macrolex ™ Violet B | Bayer |
| R72 | Solvent Violet 36/Macrolex ™ Violet 3R | Bayer |
| R32P | Solvent Green 3/Macrolex ™ Gruen 5 | Bayer |

The components shown in Table 2 were compounded in a Werner & Pfleiderer twin-screw extruder (25 millimeter screw) using a melt temperature processing range of 260° C.-340° C. A Van Dorn 85 ton injection molding press was used to mold 0.1 inch thick plaques, which were subsequently used for color and fluorescence measurements.

TABLE 2

| | Gray (pph by wt.) | | Black (pph by wt.) | | White (pph by wt.) | |
|---|---|---|---|---|---|---|
| Component | Batch 1 | Batch 2 | Batch 4 | Batch 5 | Batch 6 | Batch 7 |
| PC-1 | 5.72 | 5.72 | 5.72 | 5.72 | 5.72 | 5.72 |
| PC-2 | 65.82 | 65.82 | 65.82 | 65.82 | 65.82 | 65.82 |
| PC-ST | 14 | 14 | 14 | 14 | 14 | 14 |
| B-ABS | 3 | 3 | 3 | 3 | 3 | 3 |
| TSAN | 1 | 1 | 1 | 1 | 1 | 1 |
| DMBPC-PC | 1 | 1 | 1 | 1 | 1 | 1 |
| BPA-DP | 10 | 10 | 10 | 10 | 10 | 10 |
| Mold release | 0.3 | 0.3 | 0.3 | 0.3 | 0.3 | 0.3 |
| Antioxidant | 0.08 | 0.08 | 0.08 | 0.08 | 0.08 | 0.08 |
| Stabilizer | 0.08 | 0.08 | 0.08 | 0.08 | 0.08 | 0.08 |
| $TiO_2$ | 10 | 10 | | | 10 | 10 |
| CD 309 OL | | 0.1 | | 0.2 | | 0.01 |
| R721 | | | | | 0.05 | 0.05 |
| R201/R203 | 0.03 | 0.03 | 1 | 1 | | |
| R71 | 0.01 | 0.01 | | | | |
| R72 | 0.01 | 0.01 | | | | |
| R32P | 0.01 | 0.01 | | | | |

Mechanical and flow properties of resins formulated above were tested as per ASTM protocols: Notched Izod Impact (NII) data was obtained according to ASTM D256-2005, measured in foot pounds per inch (ft-lb/in) and percent ductility at several different test temperatures; Heat Deflection Temperature (HDT) data was measured at 264 pounds per square inch (psi) on ¼ inch bars according to ASTM D648-2004; Tensile Modulus, Tensile Stress, and Tensile Elongation (all at yield (yld)), were obtained according to ASTM D638-2003 using Type I 3.2 millimeter (mm) bars, and measured at 2.0 inches per minute (in/min); Flexural Modulus and Flexural Stress (at yield) were obtained using a 3-point flexural test, according to ASTM D790-2003, measured at 0.05 in/min over a 2 inch span; and Melt Flow Rate (MFR) data was obtained according to ASTM D1238-2004 at 260° C. and 2.16 kilogram-force (kgf) load, and was measured in grams per 10 minutes (g/10 min).

The resulting data, as set forth in Table 3, indicates that there is no significant deterioration in properties upon addition of the fluorophore irrespective of the color package used. Thus, the tagged resin can be processed at standard conditions used by molders and would not necessitate cumbersome process changes.

TABLE 3

| | | Gray | | Black | | White | |
|---|---|---|---|---|---|---|---|
| Property | Unit | 1 | 2 | 4 | 5 | 6 | 7 |
| Tensile Strength | MPa | 62.7 | 63.2 | 66.4 | 65.8 | 63.7 | 62.7 |
| Tensile Elongation | % | 4.0 | 4.1 | 4.4 | 4.2 | 4.1 | 4.1 |
| Tensile Modulus | MPa | 2970 | 2950 | 2850 | 2890 | 3070 | 2950 |
| Flex Stress | MPa | 101 | 102 | 105 | 104 | 103 | 101 |
| Flex Modulus | MPa | 2790 | 2810 | 2770 | 2800 | 2810 | 2780 |
| Notched Izod impact, 73° F. | ft-lb/in | 13.5 | 13.1 | 17.8 | 12.9 | 17.0 | 13.1 |
| HDT | ° C. | 86.4 | 86.5 | 92.3 | 89.2 | 88.6 | 86.6 |
| MFR | g/10 min | 18.1 | 19.9 | 14 | 14.8 | 16.8 | 19.4 |

Example 2

This example illustrates the ability to trigger/detect a signal from a tagged battery pack material vs. non-tagged material using photo-detectors. In the simplest case, an unfiltered photodiode is used. In another example, a filtered photodiode is used (narrower band). In yet another example, a wide-band color sensor is used comprising a filtered red, blue, green, and white-photodiode detector array (TAOS TCS230, Texas Advanced Optoelectronic Solutions Inc., Plano, Tex.). The following are images of a prototype detector capable of measuring color and fluorescence.

Figure 4:
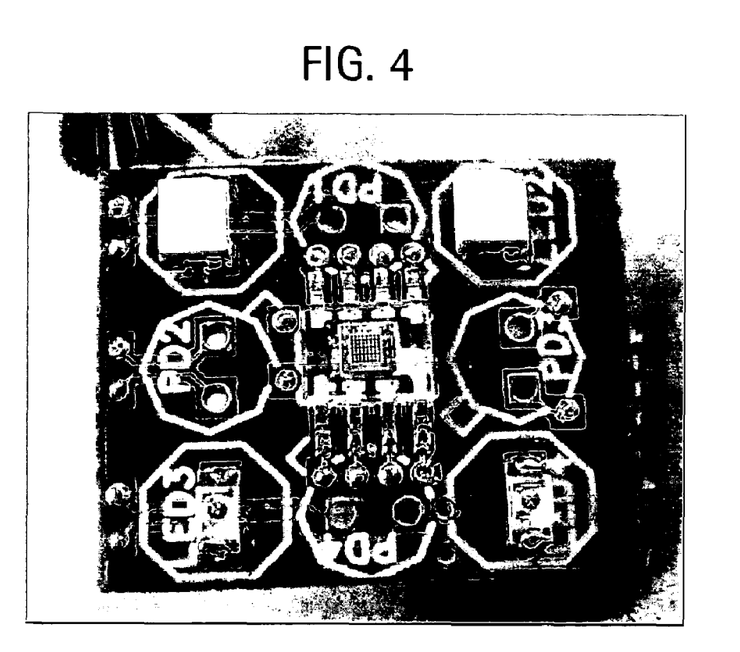
FIG. 4 is a top view of one embodiment of a detector comprising a RGB photodetector, two white light surface mount LEDs and two 395 nm ultraviolet LEDs.
Figure 5:
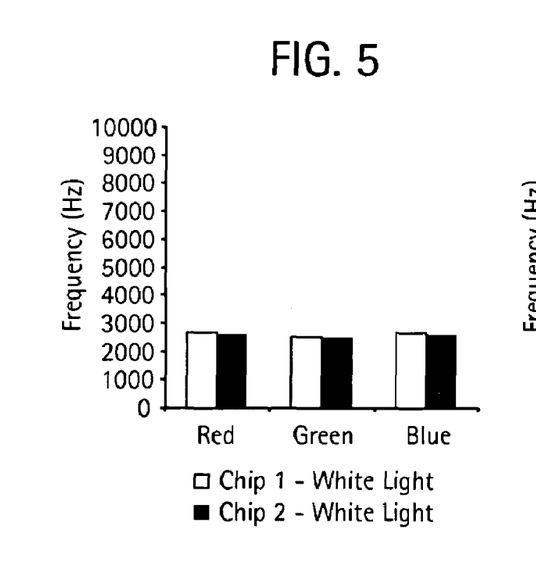
FIGS. 5, 7, and 9, are graphic illustrations of frequency responses measured at three different wavelength ranges for color chips molded with and without fluorophore under white light.
Figure 6:
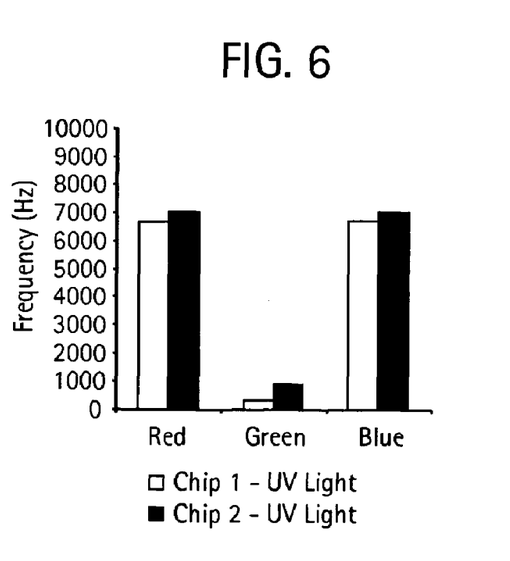
FIGS. 6, 8, and 10, are graphic illustrations of frequency responses measured at three different wavelength ranges for color chips molded with and without fluorophore under ultraviolet light.
Figure 7:
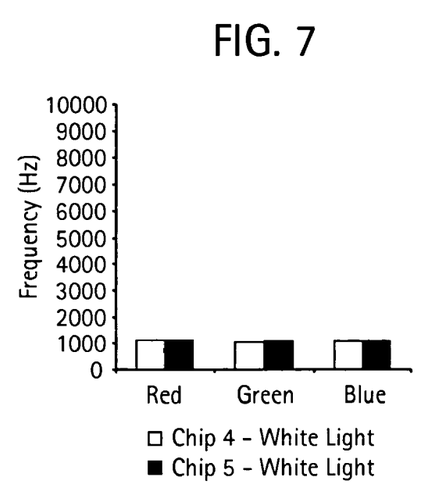
Figure 8:
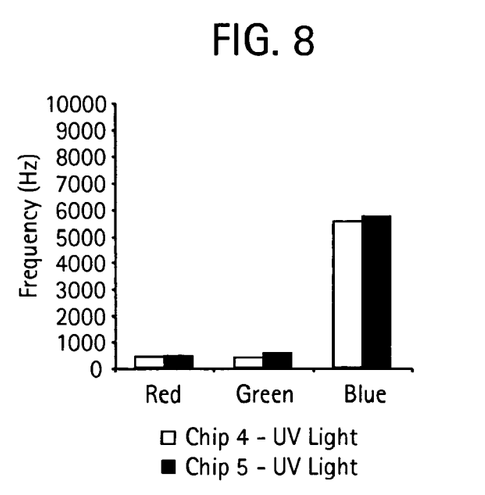
Figure 9:
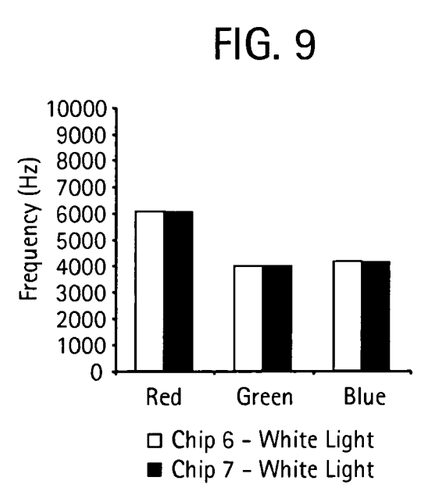
Figure 10:
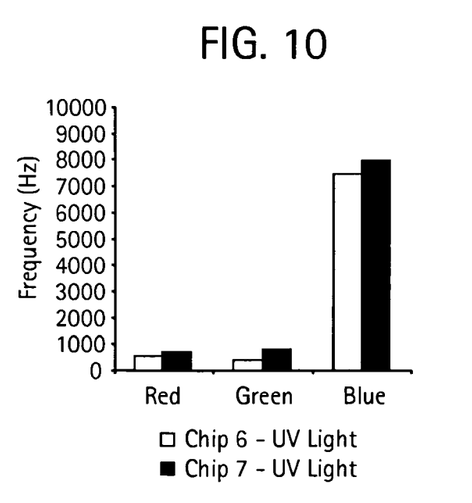

Close up view of a suitable detector made with a TAOS TCS230 RGB photodetector, two white light surface mount LEDs and two 395 nm ultraviolet LEDs is illustrated in FIG. 4. The prototype detector was used to illuminate the color chips made from corresponding batches described above, under white light and ultraviolet light. The frequency response was then measured at three different wavelength ranges, which roughly translates to red, green, and blue wavelengths. In all cases, the color chips molded with and without fluorophore appeared identical under white light, as seen in FIGS. 5, 7, and 9. Under ultraviolet light, FIGS. 6, 8, and 10, the color chips molded with fluorophore exhibited a substantial increase in frequency response. This response can be tailored by the manufacturer to enable the cellular phone to identify an authentic battery and to reject a counterfeit or non-authentic battery (e.g., fail to power the cellular phone on, fail to charge the battery, display an error signal).

Disclosed herein are devices and methods for evaluating the authenticity of cellular phone batteries by the cellular phone in which they are employed. These devices and methods offer protection for consumers against counterfeit batteries that may be lower quality, faulty, and/or overheat causing cellular phone failure, and offer manufacturers protection against degradation of brand image, reduction in lost revenues, and a reduction in recall expenses. Therefore, the device and method described herein address an unmet need for consumers and manufacturers.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device, comprising:
    a battery, wherein the device is capable of at least partially being powered by the battery;
    an excitation source capable of producing radiation and disposed so that the radiation can contact a surface of the battery;
    a photodetector capable of detecting radiation from the battery; and,
    an operating system capable of determining whether or not the battery is an authentic battery for that device.

2. The device of claim 1, wherein the authentic battery has a spectroscopic tag.

3. The device of claim 1, wherein the device is selected from the group consisting of a communication device, a computer, a vehicle, a toy, a personal digital assistant, a camera, a calculator, medical equipment, personal entertainment system, and combinations comprising at least one of the foregoing.

4. The device of claim 1, wherein the operating system is capable of controlling the device based upon whether or not the battery is the authentic battery.

5. The device of claim 4, wherein if the battery is not the authentic battery, controlling the device comprises an action selected from the group consisting of preventing the device from operating, shutting off the device, displaying a warning, locking the device from use, locking the device in a warning mode, signaling a need for service, failing to power the device on, failing to charge the battery, sending a message to the manufacturer, and a combination comprising at least one of the foregoing.

6. The device of claim 1, wherein the excitation source is further capable of a method selected from the group consisting of illuminating a display, illuminating a subject, illuminating a data storage medium, and combinations comprising at least one of the foregoing.

7. A phone capable of authenticating a battery, comprising:
    a battery;
    a transceiver in operable communication with the battery, wherein the transceiver is capable of transmitting and receiving communications;
    an excitation source capable of producing radiation and disposed so that the radiation can contact a surface of the battery;
    a photodetector capable of detecting radiation emission from the battery; and,
    an operating system capable of determining whether or not the battery is an authentic battery based on whether the battery produces an expected radiation signature.

8. The phone of claim 7, wherein the operating system is further capable of controlling the phone based upon whether or not the battery is the authentic battery.

9. The phone of claim 8, wherein if the battery is not the authentic battery, controlling the phone comprises an action selected from the group consisting of preventing the phone from operating, shutting off the phone, displaying a warning, locking the phone from use, locking the phone in a warning mode, signaling a need for service, failing to power the device on, failing to charge the battery, sending a message to the manufacturer, and a combination comprising at least one of the foregoing.

10. The phone of claim 7, wherein the battery further comprises a spectroscopic tag capable of absorbing a wavelength of radiation and emitting a different wavelength of radiation.

11. The phone of claim 10, wherein the spectroscopic tag comprises a long Stokes shift material.

12. The phone of claim 7, wherein the excitation source comprises a light emitting diode.

13. The phone of claim 12, wherein the excitation source comprises an ultraviolet light emitting diode.

14. The phone of claim 7, wherein the photodetector comprises a photodiode.

15. The phone of claim 7, wherein the photodetector comprises a charge coupled device.

16. The phone of claim 15, wherein the charge coupled device can be utilized as a component of a digital camera.

17. The phone of claim 7, wherein the operating system comprises an authentication program capable of comparing electrical communications from the photodetector to a range of values to determine if the battery is the authentic battery.

18. The phone of claim 7, wherein the phone is a cellular phone.

19. The phone of claim 7, wherein the battery comprises a label, and wherein the label comprises a spectroscopic tag.

20. A method of authenticating a battery, comprising:
irradiating a surface of a battery disposed within a device;
monitoring for radiation emitted from the surface to form a monitoring result;
producing an electrical communication correlating to the monitoring result;
comparing the electrical communication to stored data; and
determining, with the device, if the battery is authentic.

21. The method of claim 20, wherein the battery is in operable communication with a device, and further comprising controlling the device based upon whether or not the battery is authentic.

22. The method of claim 21, wherein controlling the device comprises an action selected from the group consisting of preventing the device from operating, shutting off the device, displaying a warning, locking the device from use, locking the device in a warning mode, signaling a need for service, failing to power the device on, failing to charge the battery, sending a message to the manufacturer, and a combination comprising at least one of the foregoing.

23. The method of claim 20, wherein the monitoring result is selected from the group consisting of no emission, the presence of an emission, and spectral characteristics of an emission.

* * * * *